United States Patent
Takahashi

(10) Patent No.: US 12,335,607 B2
(45) Date of Patent: *Jun. 17, 2025

(54) OBSERVATION SYSTEM, CONTROL METHOD OF OBSERVATION SYSTEM, AND CONTROL PROGRAM OF OBSERVATION SYSTEM

(71) Applicant: FUJIFILM Corporation, Tokyo (JP)

(72) Inventor: Kosuke Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,821

(22) Filed: Jun. 13, 2024

(65) Prior Publication Data

US 2024/0334042 A1 Oct. 3, 2024

Related U.S. Application Data

(63) Continuation of application No. 17/669,672, filed on Feb. 11, 2022, now Pat. No. 12,041,339, which is a
(Continued)

(30) Foreign Application Priority Data

Sep. 26, 2019 (JP) .................. 2019-175828

(51) Int. Cl.
*H04N 23/63* (2023.01)
*G03B 13/06* (2021.01)

(52) U.S. Cl.
CPC ........... *H04N 23/635* (2023.01); *G03B 13/06* (2013.01); *G09G 2320/046* (2013.01)

(58) Field of Classification Search
CPC ...... H04N 23/635; H04N 23/00; H04N 23/63; H04N 23/667; G03B 13/06; G03B 17/20;
(Continued)

(56) References Cited

U.S. PATENT DOCUMENTS

| 6,819,357 B1* | 11/2004 | Miyadera | H04N 23/69 396/374 |
|---|---|---|---|
| 2003/0156835 A1* | 8/2003 | Loo | G03B 13/10 396/378 |

(Continued)

FOREIGN PATENT DOCUMENTS

| CN | 108401103 A | 8/2018 |
|---|---|---|
| JP | H09-274239 A | 10/1997 |

(Continued)

OTHER PUBLICATIONS

International Search Report issued in PCT/JP2020/018404; mailed Jul. 21, 2020.

(Continued)

*Primary Examiner* — Timothy J Henn
(74) *Attorney, Agent, or Firm* — Studebaker Brackett PLLC

(57) ABSTRACT

A digital camera has a finder device that enables an optical image which is observable from an observation position and a display image (imaging range frame) of an OLED display to be simultaneously visible by superimposing the display image on the optical image, the digital camera including a system control unit that performs a control of sequentially changing a display position of the display image in the OLED display in a first range, in which a maximum width of the first range is 6 arc-minutes or more and 18 arc-minutes or less in terms of an observation angle (visual angle) in a case where the first range is observed from the observation position.

4 Claims, 8 Drawing Sheets

Related U.S. Application Data continuation of application No. PCT/JP2020/018404, filed on May 1, 2020.

(58) Field of Classification Search
CPC ...... G09G 2320/046; G09G 5/00; G09G 5/02; G09G 5/38
See application file for complete search history.

(56) References Cited

U.S. PATENT DOCUMENTS

| | | | | |
|---|---|---|---|---|
| 2003/0179307 | A1* | 9/2003 | Kawanishi | G02B 7/102 348/333.09 |
| 2004/0119867 | A1* | 6/2004 | Nishioka | H04N 23/673 348/E5.045 |
| 2015/0022694 | A1* | 1/2015 | Jogetsu | G03B 13/06 348/240.1 |
| 2016/0127650 | A1* | 5/2016 | Van Den Herik | G09G 3/20 348/333.01 |
| 2018/0224723 | A1 | 8/2018 | Inai | |
| 2020/0259983 | A1 | 8/2020 | Aoki | |

FOREIGN PATENT DOCUMENTS

| | | |
|---|---|---|
| JP | 2000-227775 A | 8/2000 |
| JP | 2005-37843 A | 2/2005 |
| JP | 2009-282151 A | 12/2009 |
| JP | 2014-36270 A | 2/2014 |
| JP | 2016-080740 A | 5/2016 |
| WO | 2019/087928 A1 | 5/2019 |

OTHER PUBLICATIONS

International Preliminary Report on Patentability and Written Opinion issued in PCT/JP2020/018404; issued Mar. 15, 2022.

An Office Action; "Notice of Reasons for Refusal," mailed by the Japanese Patent Office on Mar. 22, 2023, which corresponds to Japanese Patent Application No. 2022-108804 and is related to U.S. Appl. No. 17/669,672; with English language translation.

An Office Action; "Decision of Refusal," mailed by the Japanese Patent Office on Aug. 1, 2023, which corresponds to Japanese Patent Application No. 2022-108804 and is related to U.S. Appl. No. 17/669,672; with English language translation.

An Office Action mailed by China National Intellectual Property Administration on Sep. 29, 2023, which corresponds to Chinese Patent Application No. 202080061750.3 and is related to U.S. Appl. No. 17/669,672; with English language translation.

Panasonic Lumix Digital Camera Know Hows, "How Focal Length Affets Viewing Angle", retrieved from https://av.jpn.support.panasonic.com/support/global/cs/dsc/knowhow/knowhow12.html on Apr. 8, 2023 (Year: 2023).

* cited by examiner

OBSERVATION SYSTEM, CONTROL METHOD OF OBSERVATION SYSTEM, AND CONTROL PROGRAM OF OBSERVATION SYSTEM

CROSS-REFERENCE TO RELATED APPLICATIONS

This application is a Continuation of and claims the priority benefit of U.S. patent application Ser. No. 17/669,672 filed on Feb. 11, 2022, which is a Continuation of PCT International Application No. PCT/JP2020/018404 filed on May 1, 2020, which claims priority under 35 U.S.C § 119 (a) to Japanese Patent Application No. 2019-175828 filed on Sep. 26, 2019. Each of the above application(s) is hereby expressly incorporated by reference, in its entirety, into the present application.

BACKGROUND OF THE INVENTION

1. Field of the Invention

The present invention relates to an observation system that enables an optical image which is observable from a predetermined observation position and a display image of a display unit to be simultaneously visible by superimposing the display image on the optical image, and a control method and a program thereof.

2. Description of the Related Art

In WO2019/087928A, a finder device in which display information such as a frame indicating an imaging range displayed on a display unit including a self-luminous display such as an organic electro luminescence (EL) display and subject distance information can be displayed on an optical image of a subject observed through an optical finder in a superimposed manner using a half mirror is disclosed. In this finder device, the display information to be displayed is moved on the display unit, and an imaging range of an image sensor is moved in an opposite direction in accordance with a movement amount of the display information, thereby preventing misregistration between the optical image and the display information and preventing burn-in of the display unit.

JP2005-37843A discloses a control of movement of an icon for preventing burn-in of a display.

SUMMARY OF THE INVENTION

An object of the present invention is to provide an observation system, a control method of the observation system, and a non-transitory computer readable recording medium storing a control program of the observation system, which can prevent deterioration in visibility due to burn-in of a display unit while minimizing recognition of misregistration between an optical image and a display image.

An observation system according to an aspect of the present invention is an observation system that enables an optical image which is observable from a predetermined observation position and a display image of a display unit to be simultaneously visible by superimposing the display image on the optical image, the system comprising: a control unit that performs a control of sequentially changing a display position of the display image on the display unit in a first range, in which a width of a maximum portion of the first range which has a maximum length in a moving direction of the display position is 6 arc-minutes or more and 18 arc-minutes or less in terms of an observation angle in a case where the first range is observed from the observation position in a state where the first range is superimposed on the optical image.

A control method of an observation system according to an aspect of the present invention is a control method of an observation system that enables an optical image which is observable from a predetermined observation position and a display image of a display unit to be simultaneously visible by superimposing the display image on the optical image, the method comprising: a control step of performing a control of sequentially changing a display position of the display image on the display unit in a first range, in which a width of a maximum portion of the first range which has a maximum length in a moving direction of the display position is 6 arc-minutes or more and 18 arc-minutes or less in terms of an observation angle in a case where the first range is observed from the observation position in a state where the first range is superimposed on the optical image.

A non-transitory computer readable recording medium storing a control program of an observation system according to an aspect of the present invention is a non-transitory computer readable recording medium storing a control program of an observation system that enables an optical image which is observable from a predetermined observation position and a display image of a display unit to be simultaneously visible by superimposing the display image on the optical image, the program causing a computer to execute a control step of performing a control of sequentially changing a display position of the display image on the display unit in a first range, in which a width of a maximum portion of the first range which has a maximum length in a moving direction of the display position is 6 arc-minutes or more and 18 arc-minutes or less in terms of an observation angle in a case where the first range is observed from the observation position in a state where the first range is superimposed on the optical image.

According to the present invention, it is possible to provide an observation system, a control method of the observation system, and a control program of the observation system, which can prevent deterioration in visibility due to burn-in of a display unit while minimizing recognition of misregistration between an optical image and a display image.

DESCRIPTION OF THE PREFERRED EMBODIMENTS

In a system in which an optical image and a display image are superimposed and observed, in a case where a control of movement of display information is performed in order to prevent burn-in of a display unit, misregistration between the optical image and the display information occurs. Although there is a method of offsetting the misregistration by moving an image sensor, it is required to make it inconspicuous by a simpler method.

Hereinafter, a digital camera, which is an embodiment of an observation system according to the present invention, will be described with reference to the drawings.

Figure 1:
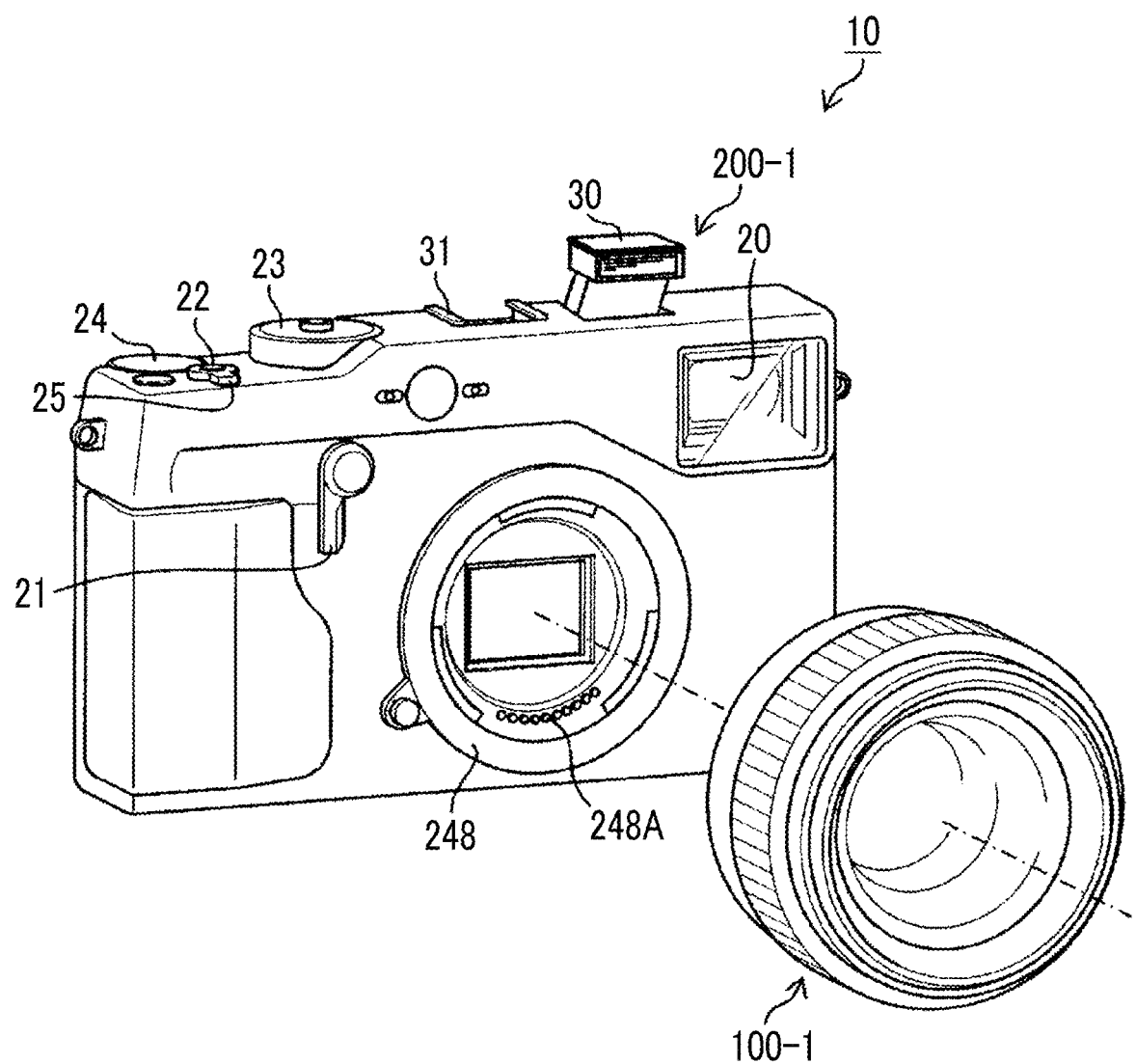
FIG. 1 is a perspective view of a digital camera 10 of an embodiment as viewed diagonally from the front.
Figure 2:
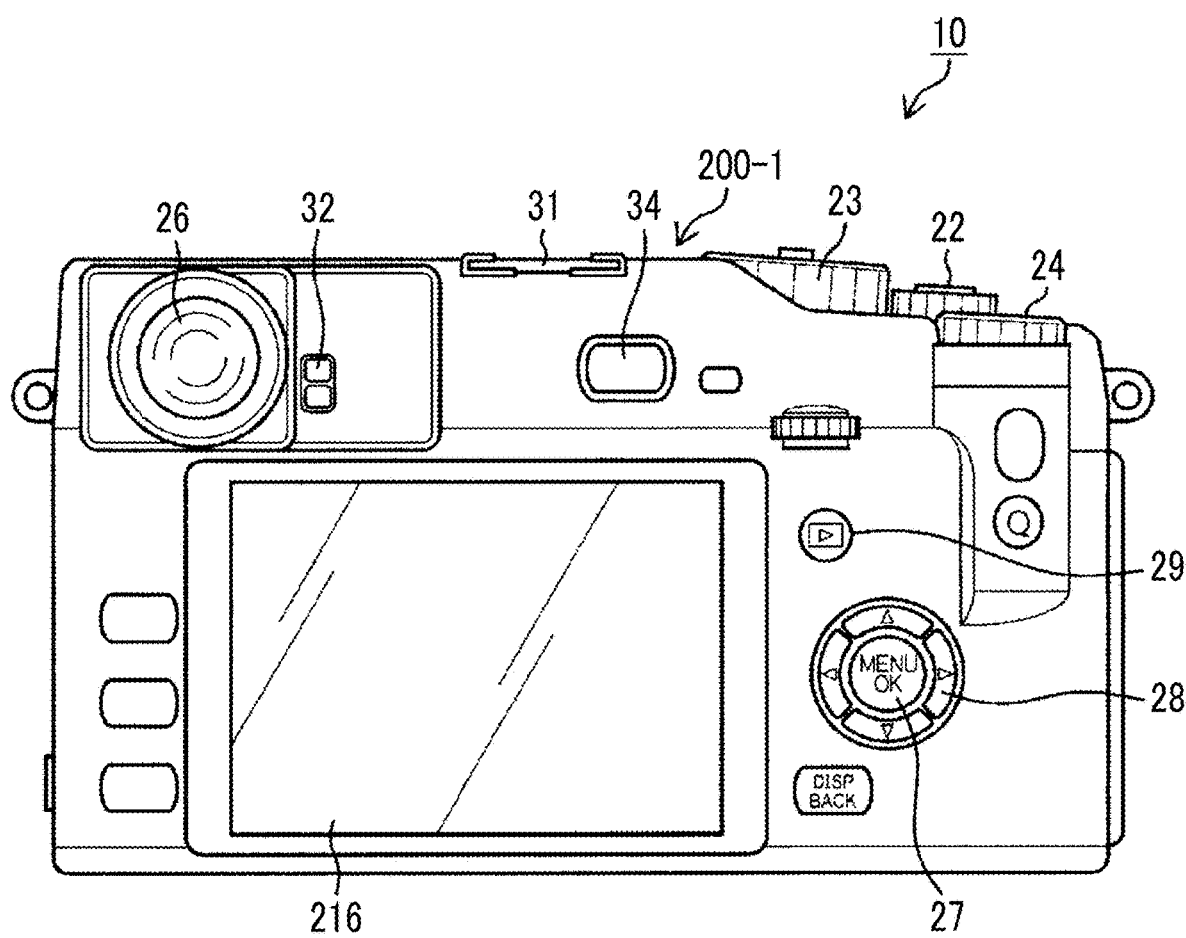
FIG. 2 is a rear view of the digital camera 10 shown in FIG. 1.

FIG. 1 is a perspective view of a digital camera 10 of the embodiment as viewed diagonally from the front. FIG. 2 is a rear view of the digital camera 10 shown in FIG. 1.

As shown in FIG. 1, the digital camera 10 is a mirror-less digital single-lens camera including an interchangeable lens 100-1 and a camera body 200-1 to which the interchangeable lens 100-1 is attachable and detachable.

In FIG. 1, a body mount 248 on which the interchangeable lens 100-1 is mounted, an objective window 20 of a finder device, and a finder switching lever 21 are provided on a front surface of the camera body 200-1. A shutter release switch 22, a shutter speed dial 23, an exposure correction dial 24, a power lever 25, a built-in flash 30, and a hot shoe 31 are provided on an upper surface of the camera body 200-1.

As shown in FIG. 2, a liquid crystal monitor 216, an eyepiece window 26 constituting an eyepiece part of the finder device, a MENU/OK key 27, a cross key 28, a playback button 29, an eye sensor 32, and a view mode button 34 are provided on a rear surface of the camera body 200-1.

The liquid crystal monitor 216 functions as a display device that displays various menu screens in addition to displaying a live view image in an imaging mode or playing back and displaying a captured image in a playback mode. The MENU/OK key 27 is an operation key that has both of a function as a menu button for giving a command to display a menu on a screen of the liquid crystal monitor 216 and a function as an OK button for giving a command to confirm, execute, or the like a selected content. The cross key 28 is an operation unit that inputs instructions in four directions of up, down, right, and left, and functions as a button for selecting an item from a menu screen or instructing selection of various setting items from each menu.

The camera body 200-1 has a built-in finder device 260-1 (FIG. 3) which is a hybrid view finder that functions as an optical view finder (OVF) or an electronic view finder (EVF). The finder switching lever 21 shown in FIG. 1 is a switching lever for switching the finder device 260-1 to an OVF or an EVF, and the finder device 260-1 is switched from an OVF to an EVF or from EVF to OVF by the operation of the finder switching lever 21.

The view mode button 34 is a button for switching between the hybrid view finder and the liquid crystal monitor 216. Each time the view mode button 34 is pressed, a mode in which the display of the hybrid view finder and the display of the liquid crystal monitor 216 are switched based on a detection output of the eye sensor 32, a mode in which the display of the hybrid view finder is fixed (the liquid crystal monitor 216 is set to non-display), and a mode in which the display of the liquid crystal monitor 216 is fixed (the hybrid view finder is set to non-display) are sequentially repeated.

The mode in which the display of the hybrid view finder and the display of the liquid crystal monitor 216 are switched based on the detection output of the eye sensor 32 is a mode in which switching to the display of the hybrid view finder is performed in a case where the eye sensor 32 detects that a face approaches the eyepiece window 26, and switching to the display of the liquid crystal monitor 216 is performed in a case where the eye sensor 32 detects the face is separated from the eyepiece window 26.

Figure 3:
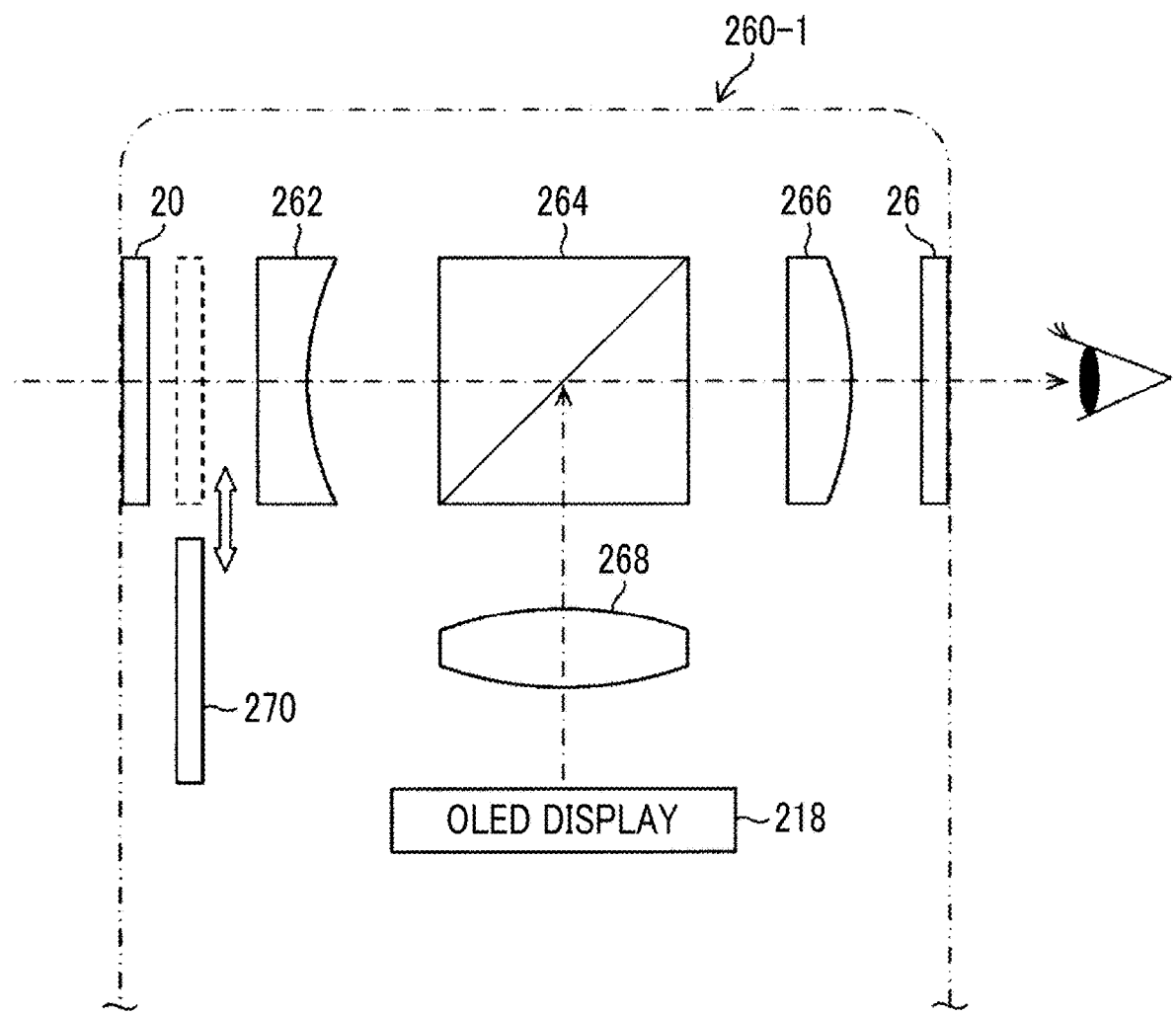
FIG. 3 is a schematic view showing a schematic configuration of a finder device 260-1 built in a camera body 200-1 of the digital camera 10 in FIG. 1.
Figure 4:
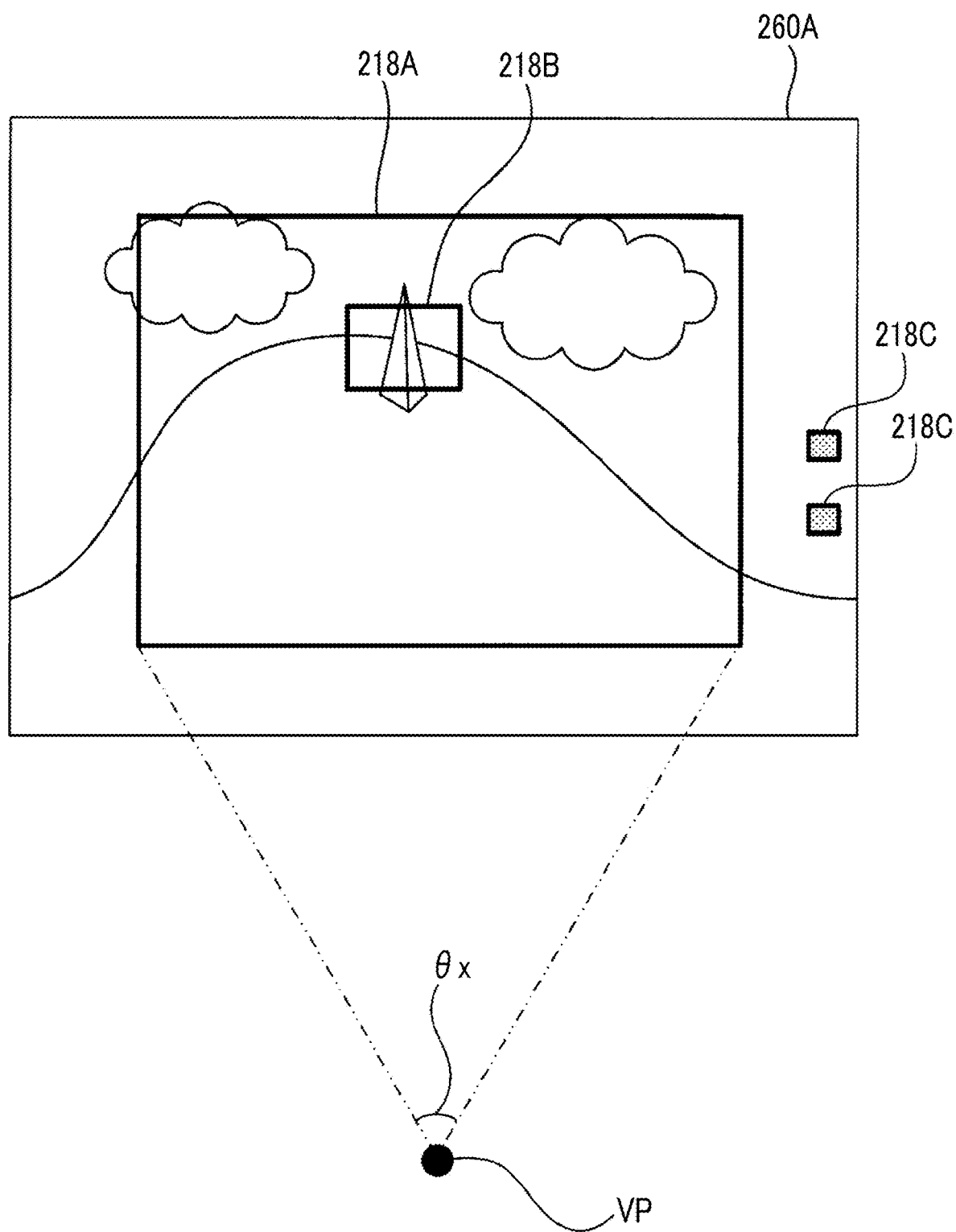
FIG. 4 is a view showing an example of an optical image and a display image observed by an observer by the finder device 260-1 in FIG. 3.

FIG. 3 is a schematic view showing a schematic configuration of the finder device 260-1 built in the camera body 200-1 of the digital camera 10 in FIG. 1. FIG. 4 is a view showing an example of an optical image and a display image observed by an observer by the finder device 260-1 in FIG. 3.

The finder device 260-1 shown in FIG. 3 is a hybrid view finder that functions as an OVF or an EVF as described above. The finder device 260-1 includes an objective lens 262, a beam splitter 264, an eyepiece lens 266, an organic light emitting diode (OLED) display 218, a target lens 268 that functions as an optical system for display, and an eyepiece window 26. The finder device 260-1 is independent of an imaging optical system described below, unlike a single-lens reflex type view finder.

A reverse Galileo type optical view finder (OVF) is composed of the concave objective lens 262 and the convex eyepiece lens 266, and the beam splitter 264 is disposed in an optical path between the objective lens 262 and the eyepiece lens 266.

The beam splitter 264 is constituted by bonding two right-angle prisms, and functions as an optical element that superimposes an optical image of a subject observed through the OVF and a display image displayed on the OLED display 218 (display unit). That is, the optical image incident on the objective lens 262 can be transmitted through the beam splitter 264 and observed through the eyepiece lens 266, and the display image displayed on the OLED display 218 can be reflected by the beam splitter 264 at right angles and observed through the eyepiece lens 266.

The OLED display 218 is one of self-luminous display devices in which display elements arranged in a two-dimensional manner emit light by themselves. As shown in FIG. 4, an imaging range frame 218A and a focus frame 218B are displayed by being superimposed on an optical image 260A incident on the objective lens 262 by the OLED display 218. In addition, the OLED display 218 displays, in a region outside the imaging range frame 218A, a plurality of icons 218C indicating the number of images that can be captured, a remaining battery level, and various setting modes in addition to imaging conditions such as a shutter speed, an F number, and international organization for standardization (ISO) sensitivity. The imaging range frame 218A is displayed as a bright frame that is bright enough to be visible even in a case where the optical image 260A is bright. The optical image 260A is an optical image of a subject range observed by an observer through the eyepiece lens 266.

The finder device 260-1 can be used as an electronic view finder (EVF) by inserting a shutter 270 in front of the objective lens 262 to block the incidence of the optical image of the subject and displaying a live view image on the OLED display 218. The finder device 260-1 can be used as an optical view finder (OVF) by retracting a shutter 270 from the front of the objective lens 262 and displaying the display image, which is illustrated in FIG. 4, on the OLED display 218.

Figure 5:
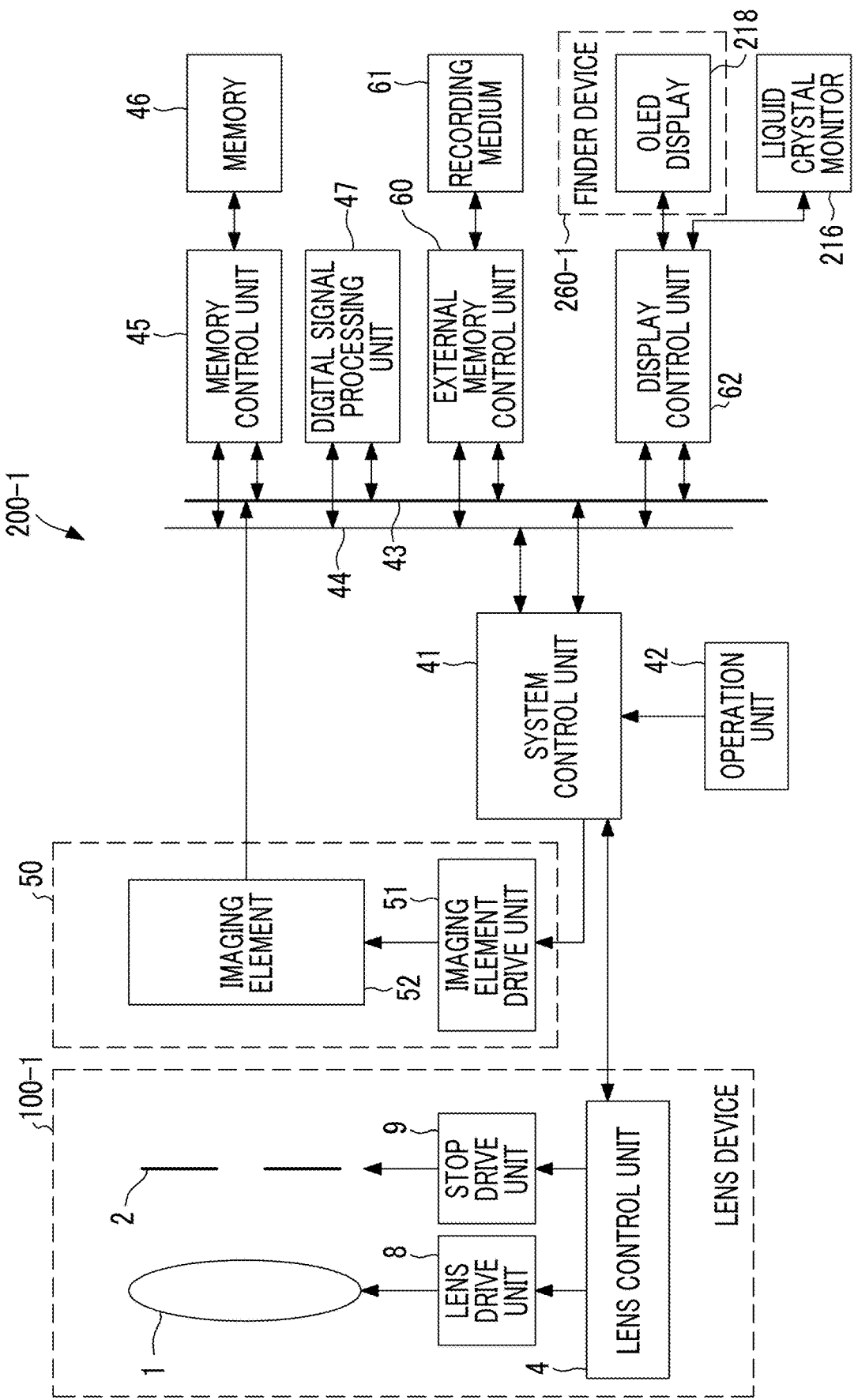
FIG. 5 is a block diagram showing an internal configuration of the digital camera 10 in FIG. 1.

FIG. 5 is a block diagram showing an internal configuration of the digital camera 10 in FIG. 1. The interchangeable lens 100-1 has an imaging lens 1, a stop 2, a lens control unit 4, a lens drive unit 8, and a stop drive unit 9. The camera body 200-1 comprises a finder device 260-1, an imaging unit 50, a system control unit 41, an operation unit 42, a display control unit 62 that controls an OLED display 218 and a liquid crystal monitor 216, a memory 46 including a random access memory (RAM) and a read only memory (ROM), a memory control unit 45 that controls recording and reading out of data into and from the memory 46, a digital signal processing unit 47, and an external memory control unit 60 that controls recording and reading out of data into and from a recording medium 61.

The interchangeable lens 100-1 may be integrated with the camera body 200-1. The imaging lens 1 includes a focus lens, a zoom lens, or the like that can be moved in an optical axis direction. The lens control unit 4 of the interchangeable lens 100-1 is configured to be able to communicate with the system control unit 41 of the camera body 200-1 by wire or wireless. In accordance with a command from the system control unit 41, the lens control unit 4 changes the position of a principal point of the focus lens by controlling the focus lens included in the imaging lens 1 through the lens drive unit 8, changes the position (focal length) of the zoom lens by controlling the zoom lens included in the imaging lens 1 through the lens drive unit 8, or controls an F number of the stop 2 through the stop drive unit 9.

The imaging unit 50 comprises an imaging element 52 that images a subject through an imaging optical system including the imaging lens 1 and the stop 2, and an imaging element drive unit 51 that drives the imaging element 52.

The imaging element 52 has an imaging surface in which a plurality of pixels are arranged two-dimensionally, and converts a subject image formed on the imaging surface through the imaging optical system, into pixel signals by the plurality of pixels, to output the pixel signals. Hereinafter, a set of the pixel signals output from the pixels of the imaging element 52 is referred to as a captured image signal.

The system control unit 41 that controls the entire electric control system of the digital camera 10 in an integrated manner drives the imaging element 52 via the imaging element drive unit 51, and outputs the subject image captured through the imaging optical system of the interchangeable lens 100-1 as the captured image signal. The digital signal processing unit 47 processes the captured image signal to generate captured image data and records it on the recording medium 61.

The imaging element drive unit 51 drives the imaging element 52 by generating a drive signal based on a command from the system control unit 41 and supplying the drive signal to the imaging element 52.

The operation unit 42 includes a finder switching lever 21, a shutter release switch 22, a shutter speed dial 23, an exposure correction dial 24, a power lever 25, a MENU/OK key 27, a cross key 28, a playback button 29, and a view mode button 34.

The system control unit 41 controls the entire digital camera 10 in an integrated manner, and a hardware structure of the system control unit 41 corresponds to various processors that perform processing by executing programs including a control program. The programs executed by the system control unit 41 are stored in the ROM of the memory 46.

The various processors include a central processing unit (CPU) that is a general-purpose processor executing a program to perform various types of processing, a programmable logic device (PLD) that is a processor of which a circuit configuration can be changed after manufacturing such as a field programmable gate array (FPGA), or a dedicated electric circuit that is a processor having a circuit configuration designed to be dedicated to executing specific processing such as an application specific integrated circuit (ASIC). More specifically, structures of the various processors are electric circuits in which circuit elements such as semiconductor elements are combined.

The system control unit 41 may be constituted by one of the various processors, or may be constituted by a combination of two or more processors of the same type or different types (for example, a combination of a plurality of FPGAs or a combination of a CPU and an FPGA).

The display control unit 62 performs a display control of the OLED display 218 and the liquid crystal monitor 216 according to a command of the system control unit 41.

The memory control unit 45, the digital signal processing unit 47, the external memory control unit 60, and the display control unit 62 are connected to one another via a control bus 44 and a data bus 43, and are controlled by the command from the system control unit 41.

In a case where the finder device 260-1 is used as an OVF, the display control unit 62 causes the OLED display 218 to display the display image including the imaging range frame 218A, the focus frame 218B, and icon 218C as shown in FIG. 4. With this, the display image (imaging range frame 218A, focus frame 218B, and icon 218C) displayed on the OLED display 218 can be displayed on the optical image 260A of the subject observed through the OVF in a superimposed manner as described referring to FIG. 4.

The display control unit 62 performs a display control for moving the display image displayed at a predetermined position of the OLED display 218 on a display surface of the OLED display 218 in order to prevent burn-in (deterioration in display characteristics due to the display image being continuously displayed at the same position for a long time) of the OLED display 218.

In a case where the finder device 260-1 (FIG. 3) that is a hybrid view finder is used as an OVF, the imaging range frame 218A, the focus frame 218B, and the icon 218C (FIG. 4) are displayed on the OLED display 218. In FIG. 4, the imaging range frame 218A and the focus frame 218B are indicated by thick black lines, but are actually displayed as bright white lines. An OLED element corresponding to the white line has a high light emission brightness, and in a case where light emission continues for a long time, burn-in occurs.

The imaging range frame 218A is an index that indicates an imaging range of the imaging element 52, and the focus frame 218B is an index that specifies a target of autofocus. The focus frame 218B can be moved to any position by user setting according to the position of a subject to be focused. On the other hand, since the positional relationship with the optical image 260A is important, the imaging range frame 218A is generally not moved and is displayed at a predetermined position on the display surface of the OLED display 218.

Figure 6:
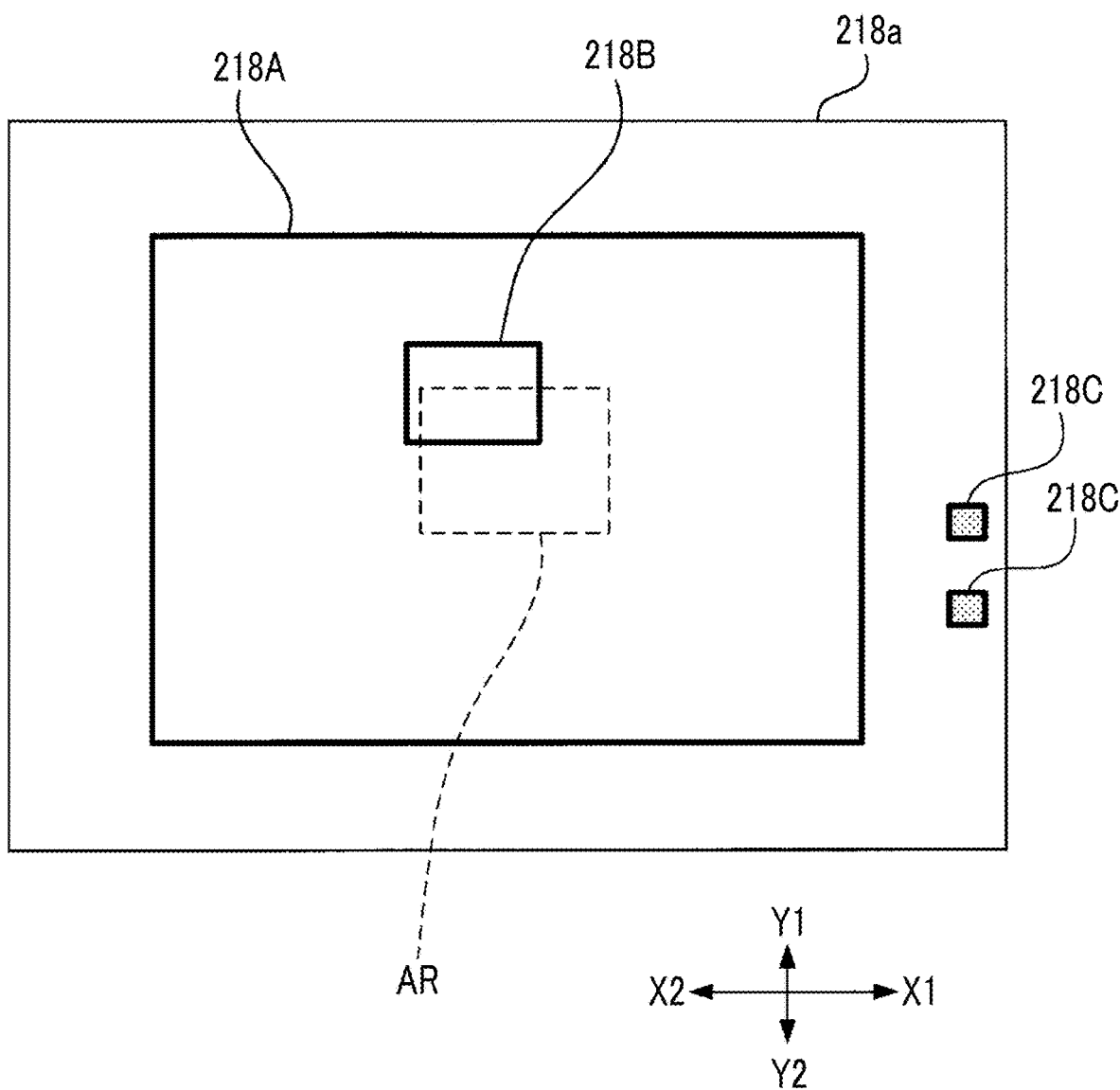
FIG. 6 is a schematic view showing a configuration of a display surface 218a of an OLED display 218 that displays various display images shown in FIG. 4.

FIG. 6 is a schematic view showing a configuration of a display surface 218a of the OLED display 218 that displays various display images shown in FIG. 4. As shown in FIG. 6, the display surface 218a has a size sufficiently larger than the size of the imaging range frame 218A. The display surface 218a has, for example, the same size as a subject range (optical image 260A in FIG. 4) observable by an observer through the eyepiece lens 266 and the eyepiece window 26.

In the following, one direction in the longitudinal direction of the display surface 218a is referred to as a direction X1, and the opposite direction of the direction X1 is referred to as a direction X2. In addition, one direction in the lateral direction of the display surface 218a is referred to as a direction Y1, and the opposite direction of the direction Y1 is referred to as a direction Y2. The direction X1 and the direction X2 correspond to the horizontal direction of a subject observed from the eyepiece window 26, and the direction Y1 and the direction Y2 correspond to the vertical direction of a subject observed from the eyepiece window 26. In the following, the direction X1 and the direction X2 are collectively referred to as the direction X, and the direction Y1 and the direction Y2 are collectively referred to as the direction Y.

On the display surface 218a, the imaging range frame 218A is displayed at a position corresponding to a range imaged by the imaging element 52 in the subject range. In addition, on the display surface 218a, the icon 218C is displayed at a position corresponding to a peripheral portion of the subject range.

A configuration in which a range corresponding to the inside of the imaging range frame 218A in the subject range (in other words, the range inside the imaging range frame 218A of the optical image 260A in FIG. 4) substantially matches a range actually imaged by the imaging element 52 is referred to as a configuration in which a finder visual field ratio of the finder device 260-1 has a nominal value of 100%. This finder visual field ratio is smaller than a nominal value of 100% in a case where the range inside the imaging range frame 218A of the optical image 260A in FIG. 4 is narrower than the range actually imaged by the imaging element 52, and is larger than a nominal value of 100% in the reverse case.

In a case where the finder visual field ratio is within a tolerance of ±1% with respect to a nominal value of 100%, the deviation between the range inside the imaging range frame 218A of the optical image 260A in FIG. 4 and the range actually imaged by the imaging element 52 is difficult to be recognized by an observer, and there is no problem in practice. Therefore, it is desirable that the finder visual field ratio of view of the finder device 260-1 is designed within a tolerance of ±1% with respect to a nominal value of 100%.

FIG. 4 shows a horizontal visual angle θx in the horizontal direction of the imaging range frame 218A in a case where the position of one eye of an observer in a state where one eye is brought into contact with the eyepiece window 26 is set to the observation position VP and the imaging range frame 218A is observed from the observation position VP. In practice, it is desirable that the horizontal visual angle θx is 30 degrees. The observation position VP is a predetermined position determined by the configuration of the digital camera 10.

In a case where the finder device 260-1 is used as an OVF, the system control unit 41 performs a control of sequentially changing the display position of the imaging range frame 218A on the display surface 218a (specifically, the center position of the imaging range frame 218A in the direction X and the direction Y) in a first range AR illustrated in FIG. 6, in order to prevent burn-in of the OLED display 218. Although the first range AR is actually a small range as will be described in detail below, is shown here in a large size for the sake of explanation.

Figure 7:
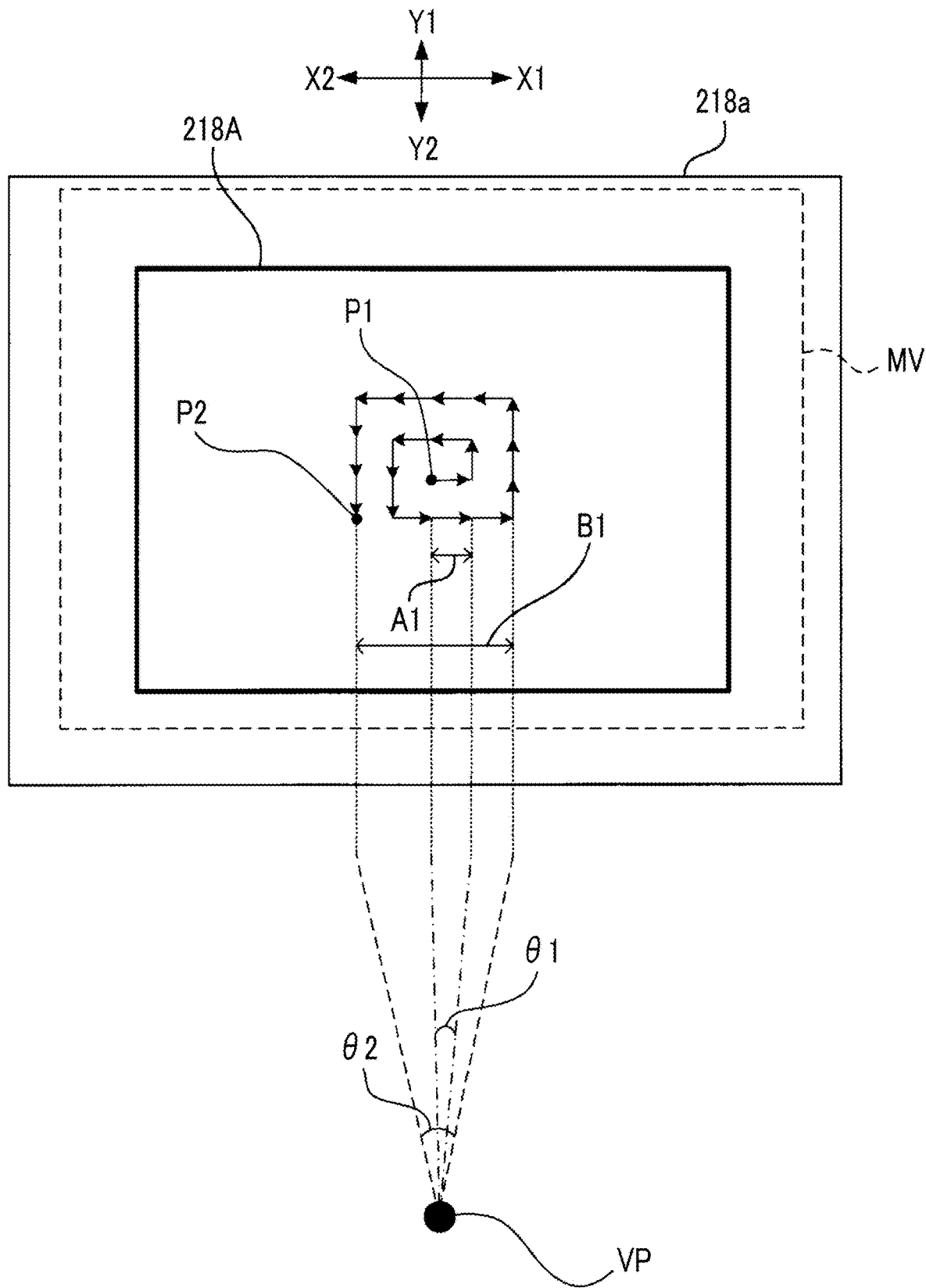
FIG. 7 is a schematic view showing an example of a control of movement of a display position of an imaging range frame 218A shown in FIG. 6.

FIG. 7 is a schematic view showing an example of a control of movement of the display position of the imaging range frame 218A shown in FIG. 6. The system control unit 41 issues a command to the display control unit 62 to sequentially change the display position of the imaging range frame 218A in a spiral shape.

Specifically, the system control unit 41 moves the display position from the initial position P1 to the direction X1 by the unit movement amount A1, then to the direction Y1 by the unit movement amount A1, then to the direction X2 by the unit movement amount A1 twice, then to the direction Y2 by the unit movement amount A1 twice, then to the direction X1 by the unit movement amount A1 three times, then to the direction Y1 by the unit movement amount A1 three times, then to the direction X2 by the unit movement amount A1 four times, then to the direction Y2 by the unit movement amount A1 three times, and then to the end position P2. After the display position reaches the end position P2, the system control unit 41 moves the display position to the initial position P1 in the reverse direction. The system control unit 41 repeatedly performs such movement control. The system control unit 41 sets the time for continuing the display of the imaging range frame 218A at each display position to be a short time (for example, several tens of seconds) such that burn-in does not occur at the display position.

The unit movement amount A1 in this movement control indicates the movement amount per one time of the display position. The unit movement amount A1 is set to a small value such that the movement cannot be recognized by an observer in a case where the display position of the imaging range frame 218A moves.

Specifically, in a case where the unit movement amount A1 is converted into a visual angle θ1 of an observer who performs the observation from the eyepiece window 26 (observation position VP), in a case where the visual angle θ1 is 2 arc-minutes (=2/60 degrees) or less, an observer whose visual acuity is 0.5 or less cannot recognize the movement of the imaging range frame 218A. This visual acuity of 0.5 is a general average visual acuity of a person. Therefore, by setting the visual angle θ1 to 2 arc-minutes or less, most observers do not need to recognize the movement of the imaging range frame 218A per one time.

With the movement control described above, the imaging range frame 218A moves, with the passage of time, in a range between a frame MV shown in FIG. 7 and the imaging range frame 218A in FIG. 7 on the display surface 218a. Therefore, during the movement of the imaging range frame 218A, an average brightness in this range is lower than an average brightness outside this range due to burn-in, and a difference in average brightness is recognized as a burn-in mark (contrast).

Therefore, in a case of performing the above-described movement control, in order to prevent an observer from recognizing this contrast, it is necessary to appropriately set the size of the maximum width (maximum width B1 in the example of FIG. 7) in the moving direction (direction X and direction Y) of the display position of the imaging range frame 218A in the first range AR.

Non-patent literature (Spatial Modulation Transfer in the Human Eye, Floris L. Van Nes and Maarten A. Bouman, Journal of the Optical Society of America Vol. 57, Issue 3, pp. 401 to 406 (1967)) discloses the relationship between the contrast and the discrimination threshold value for the spatial frequency as a general visual characteristic.

According to this visual characteristic, on the low frequency side, in a case where the spatial frequency is 5 cpd (cycle per degree; cycle per 1 degree of visual angle) or less, the contrast cannot be discriminated. Since 5 cpd is a state where lightness and darkness differences of 5 times are included per 60 arc-minutes (=1 degree) of visual angle, one lightness and darkness difference occurs at a visual angle of 60 arc-minutes÷5=12 arc-minutes. The state where one lightness and darkness difference occurs at a visual angle of 12 arc-minutes corresponds to a state where the imaging range frame 218A shown in FIG. 7 is moved by a maximum visual angle of 6 arc-minutes (12 arc-minutes=2). Therefore, in a case where the maximum width B1 shown in FIG. 7 is set to 6 arc-minutes or more in a case where the first range AR is converted into the visual angle θ2 in a case of being observed from the eyepiece window 26, an observer does not need to recognize burn-in (contrast) caused by the movement of the imaging range frame 218A.

Here, in a case where this maximum width B1 is set too large, the deviation between a subject in the imaging range frame 218A and a subject actually imaged by the imaging element 52 becomes large. As described above, it is desirable that the horizontal visual angle θx of the imaging range frame 218A shown in FIG. 4 is 30 degrees. It is desirable that the finder visual field ratio is designed within a tolerance of ±1% with respect to a nominal value of 100%. That is, with the tolerance of 1% (=0.3 degrees) of the horizontal visual angle θx=30 degrees, even though the imaging range frame 218A moves in the horizontal direction, the deviation between the subject in the imaging range frame 218A and the subject actually imaged does not cause problem in practice. Therefore, by setting an upper limit value of the maximum width B1 shown in FIG. 7 to the visual angle θ2=0.3 degrees (=18 arc-minutes), an observer does not need to recognize the deviation between the subject in the imaging range frame 218A and the subject actually imaged.

As described above, in the digital camera 10, the maximum value (the above-described maximum width B1) of the movement width in a case where the display position of the imaging range frame 218A is sequentially moved is 6 arc-minutes or more and 18 arc-minutes or less in terms of the visual angle (observation angle) of an observer who performs the observation from the eyepiece window 26. This configuration makes it difficult for an observer to recognize the burn-in mark of the imaging range frame 218A, and also makes it possible to keep the deviation between the subject in the imaging range frame 218A observed through the OVF and the subject imaged by the imaging element 52 within an allowable range. As a result, it is possible to improve the visibility in a case of using the OVF and to perform intended imaging of the subject.

In addition, in the digital camera 10, the movement width per one time (the above-described unit movement amount A1) in a case where the display position of the imaging range frame 218A is sequentially moved is 2 arc-minutes or less in terms of the visual angle (observation angle) of an observer who performs the observation from the eyepiece window 26. With this configuration, the movement of the imaging range frame 218A is not recognized by an observer, so that the usability of the OVF can be improved.

Hereinafter, a modification example of the digital camera 10 will be described.

In the above description, although the display position is moved only for the imaging range frame 218A, the focus frame 218B and the icon 218C may also be controlled to be sequentially moved in a predetermined range. Also in this case, the maximum width of this predetermined range need only be 6 arc-minutes or more and 18 arc-minutes or less in terms of the observation angle. In addition, the movement amount per one time need only be 2 arc-minutes or less in terms of the observation angle.

As shown in FIG. 4, the display image displayed on the OLED display 218 includes the imaging range frame 218A and the focus frame 218B, which are first display images whose correlation with the optical image 260A is equal to or greater than a threshold value, and the icon 218C, which is a second display image whose correlation with the optical image 260A is less than the threshold value. Of these display images, only the first display image may be configured to perform the above-described movement control. According to this configuration, the display control can be simplified and the processing load of the system control unit 41 can be reduced. Here, the correlation can be, for example, a value indicating a ratio of a region where the display image and the feature region in the optical image are superimposed to the entire region of the display image, or a value indicating the reciprocal of the distance between the display image and the feature point in the optical image. The feature region in the optical image can be detected by a known method such as face detection. In addition, the imaging range frame 218A itself may be used as the feature region. In this configuration, for the second display image, burn-in prevention control may be performed such as randomly moving the display position, sequentially changing the display color while keeping the display position fixed, or sequentially changing display and non-display while keeping the display position fixed.

Figure 8:
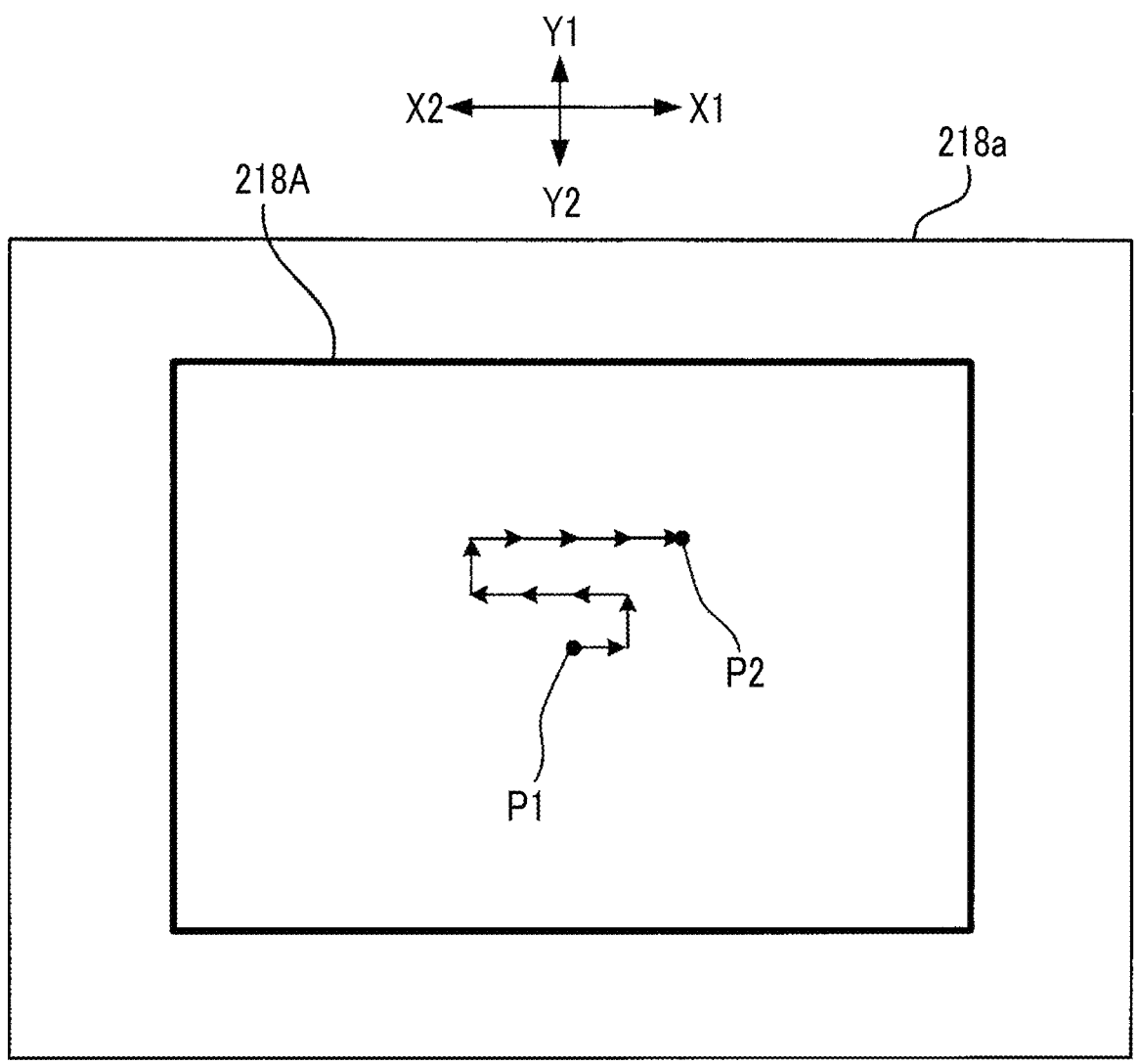
FIG. 8 is a schematic view showing a modification example of the control of movement of the display position of the imaging range frame 218A shown in FIG. 6.

In the example of FIG. 7, although the display position of the imaging range frame 218A is moved in a spiral shape, the moving method is not limited thereto. For example, as shown in FIG. 8, the display position may be changed in a zigzag shape from the initial position P1 to the end position P2.

Although the display control in the OLED display 218 of the finder device 260-1 mounted on the digital camera has been described in the above embodiment, the display control can be similarly applied to an observation system that enables an optical image which is observable from a predetermined observation position and a display image of a display unit to be simultaneously visible by superimposing the display image on the optical image. As such an observation system, a see-through type head-mounted display that enables the outside to be visible or a spectacle type display device that enables an optical image and a display image to be simultaneously observed by providing a transmissive display unit on a glass part of the spectacles can be used. The head-mounted display and the spectacle type display device each have a wearing part that is worn on an eye part of an observer, a display unit, and an imaging unit, and the optical image and the display image are simultaneously visible to an observer in a state where the wearing part is worn by the observer. The above-described display control is particularly effective in a case of displaying a frame indicating an imaging range of the imaging unit on the display unit.

The display unit mounted on these observation systems is not limited to an OLED display, and may be another display (for example, a liquid crystal display).

As described above, the following items are described in the present specification. Note that the components and the like corresponding to the above embodiments are shown in parentheses, but the present invention is not limited thereto.

(1)

An observation system (digital camera 10) that enables an optical image (optical image 260A) which is observable from a predetermined observation position (observation position VP) and a display image (imaging range frame 218A) of a display unit (OLED display 218) to be simultaneously visible by superimposing the display image on the optical image, the system comprising:

a control unit (system control unit 41) that performs a control of sequentially changing a display position of the display image on the display unit in a first range (first range AR), in which a width (maximum width B1) of a maximum portion of the first range which has a maximum length in a moving direction of the display position is 6 arc-minutes or more and 18 arc-minutes or less in terms of an observation angle (visual angle θ2) in a case where the first range is observed from the observation position in a state where the first range is superimposed on the optical image.

(2)

The observation system according to (1), in which a movement amount (unit movement amount A1) in a case where the display position in the first range changes once is 2 arc-minutes or less in terms of the observation angle.

(3)

The observation system according to (1) or (2), further comprising:

an imaging unit (imaging unit 50) that captures a part of the optical image, in which the display image includes an image (imaging range frame 218A) showing an imaging available range of the imaging unit.

(4)

The observation system according to any one of (1) to (3), in which the control unit moves the display position in a first direction (direction X1), a second direction (direction Y1) orthogonal to the first direction, an opposite direction (direction X2) of the first direction, and an opposite direction (direction Y2) of the second direction.

(5)

The observation system according to any one of (1) to (4), in which the display image includes a first display image (imaging range frame 218A and focus frame 218B) whose correlation with the optical image is equal to or greater than a threshold value and a second display image (icon 218C) whose correlation with the optical image is less than the threshold value, and the control unit performs the control on the first display image.

(6)

The observation system according to (5), in which the control unit performs a control of sequentially changing a color or sequentially changing display and non-display on the second display image.

(7)

The observation system according to any one of (1) to (6), further comprising:

a wearing part that is worn on an eye part; and the display unit, in which the optical image and the display image are simultaneously visible to an observer in a state where the wearing part is worn by the observer.

(8)

The observation system according to any one of (1) to (6), further comprising:

an eyepiece part (eyepiece window 26); and the display unit, in which the optical image and the display image are simultaneously visible to an observer in a state where an eye of the observer is brought into contact with the eyepiece part.

(9)

A control method of an observation system that enables an optical image which is observable from a predetermined observation position and a display image of a display unit to be simultaneously visible by superimposing the display image on the optical image, the method comprising:

a control step of performing a control of sequentially changing a display position of the display image on the display unit in a first range, in which a width of a maximum portion of the first range which has a maximum length in a moving direction of the display position is 6 arc-minutes or more and 18 arc-minutes or less in terms of an observation angle in a case where the first range is observed from the observation position in a state where the first range is superimposed on the optical image.

(10)

A control program of an observation system that enables an optical image which is observable from a predetermined observation position and a display image of a display unit to be simultaneously visible by superimposing the display image on the optical image, the program causing a computer to execute a control step of performing a control of sequentially changing a display position of the display image on the display unit in a first range, in which a width of a maximum portion of the first range which has a maximum length in a moving direction of the display position is 6 arc-minutes or more and 18 arc-minutes or less in terms of an observation angle in a case where the first range is observed from the observation position in a state where the first range is superimposed on the optical image.

EXPLANATION OF REFERENCES 100-1: interchangeable lens
200-1: camera body
1: imaging lens
MV: frame
P1: initial position
A1: unit movement amount
B1: maximum width
P2: end position
4: lens control unit
8: lens drive unit
9: stop drive unit
10: digital camera
41: system control unit
20: objective window
21: finder switching lever
22: shutter release switch
23: shutter speed dial
24: exposure correction dial
25: power lever
26: eyepiece window
27: MENU/OK key
28: cross key
29: playback button
30: built-in flash
32: eye sensor
34: view mode button
42: operation unit 43: data bus
44: control bus
45: memory control unit
46: memory
47: digital signal processing unit
50: imaging unit
51: imaging element drive unit
52: imaging element
60: external memory control unit
61: recording medium
62: display control unit
216: liquid crystal monitor
218A: imaging range frame
218B: focus frame
218C: icon
218a: display surface
218: OLED display
248: body mount
260-1: finder device
260A: optical image
262: objective lens
264: beam splitter
266: eyepiece lens
268: target lens
270: shutter

What is claimed is:

1. An observation system that enables an optical image which is observable from a predetermined observation position and a display image of a display to be simultaneously visible by superimposing the display image on the optical image, the system comprising:
 a processor configured to perform a control of sequentially changing a display position of the display image on the display in a first range; and
 an imager comprising an imaging element that captures a part of the optical image,
 wherein a width of a maximum portion of the first range which has a maximum length in a moving direction of the display position is equal to or less than a tolerance between a range of the display image of the display corresponding to an imaging range of the imaging element and the imaging range of the imaging element that captures the part of the optical image, and a contrast caused by movement of the display position of the display image is set to a width that is unable to be discriminated based on a visual characteristic by a human eye.

2. The observation system according to claim 1, further comprising:
 a finder through which the optical image and the display image are simultaneously visible,
 wherein, as the tolerance, a tolerance of a visual field ratio of the finder is used.

3. A control method of an observation system that enables an optical image which is observable from a predetermined observation position and a display image of a display to be simultaneously visible by superimposing the display image on the optical image, the method comprising:
 performing a control of sequentially changing a display position of the display image on the display in a first range,
 wherein a width of a maximum portion of the first range which has a maximum length in a moving direction of the display position is equal to or less than a tolerance between a range of the display image of the display corresponding to an imaging range of an imaging element that captures a part of the optical image and the imaging range of the imaging element, and a contrast caused by movement of the display position of the display image is set to a width that is unable to be discriminated based on a visual characteristic by a human eye.

4. A non-transitory computer readable recording medium storing a control program of an observation system that enables an optical image which is observable from a predetermined observation position and a display image of a display to be simultaneously visible by superimposing the display image on the optical image, the program causing a computer to execute
 performing a control of sequentially changing a display position of the display image on the display in a first range,
 wherein a width of a maximum portion of the first range which has a maximum length in a moving direction of the display position is equal to or less than a tolerance between a range of the display image of the display corresponding to an imaging range of an imaging element that captures a part of the optical image and the imaging range of the imaging element, and a contrast caused by movement of the display position of the display image is set to a width that is unable to be discriminated based on a visual characteristic by a human eye.

* * * * *